United States Patent Office 2,933,729
Patented Apr. 19, 1960

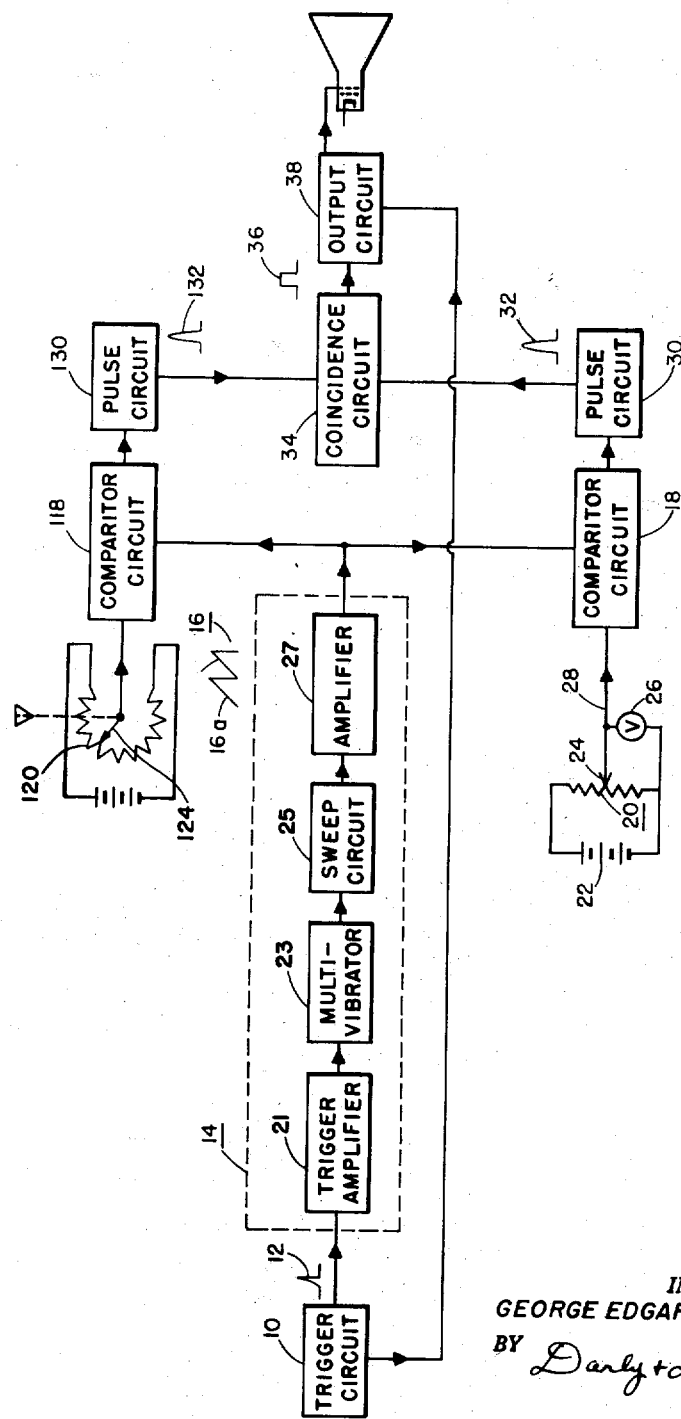

2,933,729
CALIBRATOR CIRCUIT

George Edgar McElroy, Harrington Park, N.J., assignor to Allen B. Du Mont Laboratories, Inc., Clifton, N.J., a corporation of Delaware Application June 15, 1956, Serial No. 591,704

2 Claims. (Cl. 343—113)

This invention relates to calibrator circuits, and more particularly to a circuit which may be utilized for precise calibration of apparatus which indicates the instantaneous position of a rotating device.

Many airport radar airplane landing systems utilize antennas which either rotate continuously, or "nod" to scan a given sector. The airplane position signals picked up by the antenna are then displayed as spots of light on the face of a cathode ray tube. For a particular airport, the face of the cathode ray tube has positioned thereon a transparent map, or overlay, showing the various runways, buildings, etc. Alternatively, this map may be produced electronically on the face of the cathode ray tube. It is of course essential that there be exact correspondence between display signals representing a runway as picked up by the antenna, and the actual position of the runway on the map.

In the past when it was desired to coordinate the display with the overlay map, the antenna was stopped in a number of positions, and the display circuits adjusted for correspondence at each position or, in some instances, fixed targets could be picked up by the antenna, and their display position adjusted to coincide with their map position. This latter procedure had the disadvantage that the fixed targets were of necessity at the unused extremities of the airport rather than at the useful center portions. A further disadvantage was present if the antenna measured elevation (the height of an aircraft above ground) since fixed targets are not feasible for calibration of this type of antenna.

It is, therefore, the principal object of my invention to provide an improved calibrator.

It is another object of my invention to produce a calibration circuit which may be used without taking the antenna out of service.

The attainment of these objects and others will be realized from a study of the following specification, taken in conjunction with the single figure of drawings which is a block diagram of the circuitry of my invention.

The basic concept of my invention is to produce as part of the display, a "Strobe-line" which is adjustable to, and occurs at, any given instantaneous position of the antenna as the antenna scans through its desired range. Since the Strobe-line is produced continually wtihout stopping the antenna, it permits immediate and repeated calibration. If the Strobe-line is adjusted to a predetermined position, an immediate indication is given of any drift or malfunction of the display circuits.

In the figure, a trigger circuit 10 (which may be associated with the system trigger circuitry) produces a reference trigger 12 which energizes a reference voltage generator 14. This produces cyclically a varying voltage—preferably a sawtooth waveform such as 16—which is applied to comparators 18 and 118. The circuitry of reference voltage generator 14 may include a trigger amplifier 21, a multivibrator 23, a sweep circuit generator 25, an amplifier 27, and/or other suitable circuitry, to control the phase, amplitude, and other characteristics of the reference voltage waveform. For ease of explanation, let us assume that the potential of the reference voltage waveform 16 varies from 0 volts to 100 volts at a rate of 2,000 cycles per second.

A calibrating potentiometer 20 is connected across a source of direct potential 22 to produce a calibrating voltage. If the slider 24 of calibrating potentiometer 20 is adjusted to produce a calibrating voltage, say 25 volts, as indicated by precision voltmeter 26, this calibrating voltage will be applied through connection 28 to another input terminal of comparator 18. At the instant the value of the potential of reference waveform 16 equals the preselected value (25 volts) of the calibrating potential obtained from calibrating potentiometer 20, the comparator circuit 18 feeds a signal to a pulse forming circuit 30 which produces a calibration "pulse" 32 which is in turn applied to an input terminal of coincidence circuit 34. It will be understood that the described setting of calibration potentiometer 20 will, at the rate of 2,000 per second, supply to coincidence circuit 34 a calibration pulse which always occurs exactly the same time interval after reference trigger 12. Adjustment of calibrating potentiometer 20, in conjunction with meter 26, will therefore provide a calibration pulse at a constant but adjustable time interval after the occurrence of reference trigger 12.

Rotating antennas have associated therewith a device for producing a sensing signal voltage which corresponds with the antenna's angular position. This device in its simplest form may comprise a potentiometer whose resistance element is connected across a source of direct potential. As the antenna rotates, the potentiometer slider will produce a linearly increasing sawtooth waveform, any particular value of which is directly associated with the instantaneous angular position of the antenna. A simple device such as described above has inherent shortcomings such as contact resistance, arcing, discontinuities, etc., and may be replaced by other devices which are more satisfactory. For the sake of simplicity this discussion will assume a sensing potentiometer, and that the antenna rotates intermittently at a relatively slow speed—each step producing a sensing voltage which acts, and is processed, as though it had been produced by a potentiometer 120, similar to calibrating potentiometer 20. Actually it is not necessary that the sensing voltage be a linear sawtooth waveform. Thus, when the first reference voltage waveform 16a has a value which equals the sensing voltage developed at the first step of the antenna, comparator 118 energizes pulse generating circuit 130 to produce a sensing pulse 132 which is applied to a second input terminal of coincidence circuit 34. Since the antenna is at its first step, the sensing voltage is low, and sensing pulse 132 applied to coincidence circuit 34 will occur a relatively short time after the occurrence of reference trigger 12. As the antenna moves to its second step, the previously described action (now utilizing waveform 16b) is repeated, and provides a second sensing pulse which occurs somewhat later when compared to the reference trigger. As the antenna rotates still further to a third step, a third sensing pulse will be produced which is delayed even longer compared with the reference trigger. It will thus be seen that the circuits coacting with the sensing device attached to the antenna will apply to coincidence circuit 34 a series of sensing pulses, each progressively delayed, relative to the reference trigger. Since the reference voltage waveform recurs at a rate of 2,000 per second, these sensing pulses occur in very rapid succession; and one of them will coincide exactly (time wise) with the calibration pulse developed by calibrating potentiometer 20. When this occurs, the action of coincidence circuit 34 is such as to produce an output signal 36 which may be fed through suitable output circuitry 38 to the brightness control of the cathode ray tube to intensify a particular portion, thus producing a bright Strobe-line for that particular setting of potentiometer 20. The output circuitry may be designed to produce a pulse of desired width which occurs at the desired time interval and frequency relative to the initiating trigger.

As will be understood, the time position of calibrating pulse 32 may be very closely controlled by the use of precision meter 26. Similarly, the occurrence of sensing pulse 132 will correspond very closely with the instantaneous angular position of the antenna. Since my circuit compares each of those with the same reference voltage 16, it is immaterial whether the waveforms are precisely linear. Even greater precision may be obtained by utilizing circuitry which forms very narrow pulses, and a coincidence circuit 34 which responds to precise coincidence of the pulses. It will also be seen that the waveforms of the reference and sensing voltages may be positive going or negative going, and may in fact be of opposite sense since only their actual values are utilized.

Due to mechanical and theoretical considerations, the antenna rotates so slowly that the sensing voltage looks more like a direct voltage than a sawtooth waveform. It is therefore impossible to compare it directly with the calibrating voltage.

As has been previously stated, the sensing device attached to the rotating antenna produces a sensing potential whose values correspond to the antenna position; thus an antenna position of 10° may correspond to 10 volts, while an antenna position of 90° could correspond to 90 volts. However, this relationship is not absolutely necessary. Setting calibrating potentiometer 20 to produce a calibration potential of 10 volts would produce a brightened Strobe-line every time the antenna sensing device produces 10 volts—which occurs at the 10° position. Thus, without stopping the antenna, the display may be adjusted so that the strobe-line coincides with a 10° reference mark on the map. Similarly, setting the calibrating potentiometer to 90 volts would produce a brightened Strobe-line every time the antenna position corresponds to 90°. In this manner, any portion of the display may be adjusted to coincide with its proper position on the map of the area scanned by the antenna.

My invention, as hereinabove disclosed, minimizes the necessity of having a linear sawtooth voltage waveform, i.e. calibrating potentiometer 20 would produce a calibrating pulse, whether the waveform 16 were linear, curved, or distorted. The same is true of the sensing potential developed by the sensing device. Therefore, due to my invention, precisely linear sawtooth waveforms are no longer essential.

Having described one embodiment of my invention, I desire not to be limited by the foregoing description, but rather by the claims granted to me.

What is claimed is:

1. A rotatable antenna position calibrating circuit comprising: means producing a progressively varying reference voltage; means producing an adjustable calibrating voltage; means producing a calibrating pulse when said adjusted calibrating voltage equals said varying reference voltage; means sensing the angular position of said antenna; means, energized by said position sensing means, producing an antenna position sensing voltage; means producing an antenna position sensing pulse when said antenna position sensing voltage equals said varying reference voltage; and means producing a brightened strobe-line when said sensing and calibrating pulses coincide.

2. A rotatable antenna position calibrating circuit comprising: means producing a trigger pulse; means, energized by said trigger pulse, producing a progressively varying reference voltage; means, including a potentiometer, producing an adjustable calibrating voltage; means producing a calibrating pulse when said adjusted calibrating voltage equals said varying reference voltage; means sensing the angular position of said antenna, said means comprising a potentiometer having its slider rotating with said antenna; means whereby said slider produces an antenna position sensing voltage; means producing an antenna position sensing pulse when said antenna position sensing pulse equals said varying reference voltage; means, including a coincidence circuit, producing the output signal when said sensing and calibrating pulses are concurrent; and means causing said output signal to produce a brightened radial line of a cathode ray tube presentation.

References Cited in the file of this patent

UNITED STATES PATENTS

| | | |
|---|---|---|
| 2,421,747 | Engelhardt | June 10, 1947 |
| 2,576,346 | Johnston | Nov. 27, 1951 |
| 2,588,114 | Haworth | Mar. 4, 1952 |
| 2,685,687 | Falk | Aug. 3, 1954 |
| 2,702,899 | Page | Feb. 22, 1955 |
| 2,773,255 | Meier | Dec. 4, 1956 |